Oct. 12, 1937.  D. S. KENNEDY  2,095,523
NONSKID DEVICE
Filed Feb. 3, 1937
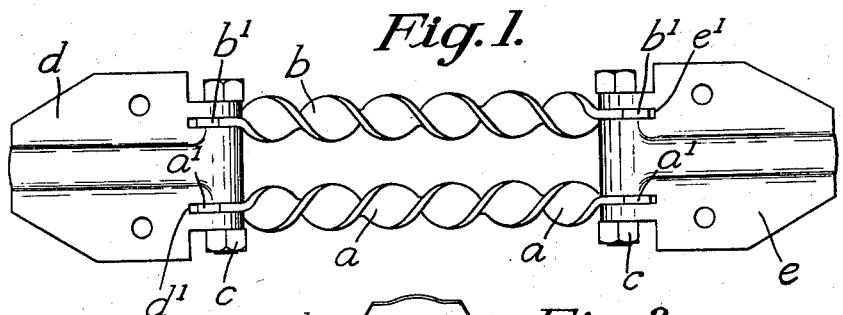
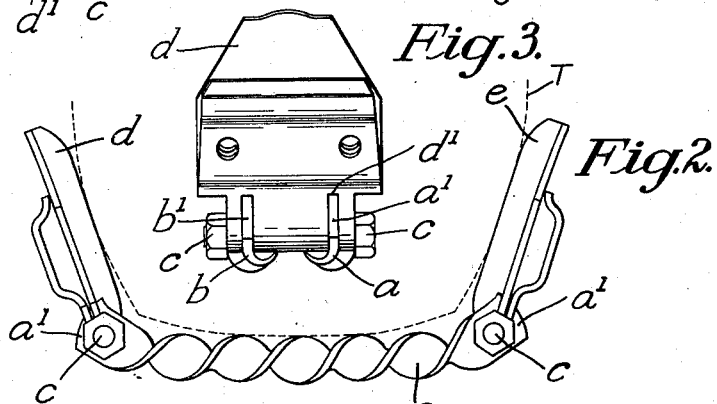
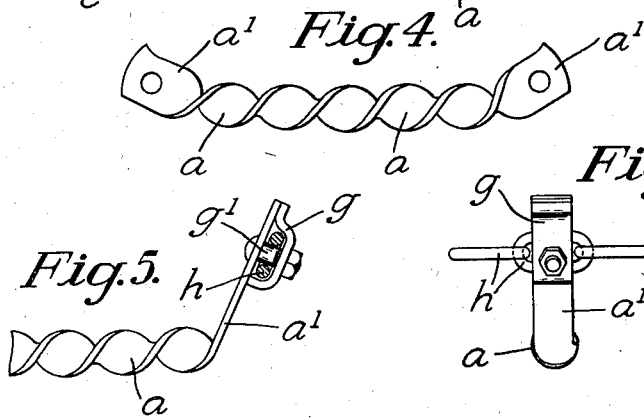
Inventor:-
Donald S. Kennedy,
By Smith, Michael & Gardiner,
Attorneys.

Patented Oct. 12, 1937

2,095,523

UNITED STATES PATENT OFFICE 2,095,523

NONSKID DEVICE

Donald Stuart Kennedy, Longparish, Andover, England

Application February 3, 1937, Serial No. 123,933
In Great Britain February 14, 1936

5 Claims. (Cl. 152—14)

This invention relates to overall chains or girdles for use upon the tires of road vehicle wheels. More particularly, it relates to that kind of overall chain or girdle which comprises a detachable endless track consisting of a series of spaced-apart tread shoes connected by lateral retaining-chains.

The present invention has for object to cheapen the manufacture and to reduce the weight of these tread shoes, to give an improved grip between the shoes and the ground and also between the shoes and the tire, and to reduce or to prevent "caking" of the shoe, by clay, snow or the like.

According to the present invention, I construct the cross-member or tread portion of the shoe with one or more transverse elements formed from metal bar or ribbon of twisted shape, each such element being substantially rigid throughout its length and having at its ends, attachment lugs whereby it may be engaged with the side walls or wings of the shoe or with the lateral retaining-chains. Where two (or more) such transverse elements are provided as fore and aft tread members of each shoe, the coils or twists are preferably of opposite hand in adjacent elements so as to check side slip. Thus, where two twisted elements are provided in one shoe or cross-member of the endless chain, they would be respectively one of right hand and the other of left hand twist.

These transverse elements of twisted metal bar are made integral with the end lugs. The axial line of the twisted element may be straight or curved throughout, or the elements and attachment lugs may be shaped to straddle the outer part or tread part of the pneumatic tire.

The invention is hereafter described with reference to the accompanying drawing, in which:—

Fig. 1 is a plan view of the shoe, showing the twisted elements, and the side wings pivoted thereto.

Fig. 2 is a front elevation of that form of construction, with the position of the tire indicated in dotted lines, and Fig. 3 is an end view thereof.

Fig. 4 shows a single twisted element removed from Fig. 1.

Fig. 5 shows in front elevation, part section, another location of the chains or link members and Fig. 6 is an end view of Fig. 5.

The drawing shows in Figs. 1–3 the present invention applied, by way of example, to the cross members of an overall tire chain of the kind described and shown in my prior patent specification No. 1,942,337.

The two elements $a$ $b$ are each formed from a one-piece, rigid, twisted metal bar or ribbon. One element $a$ has a right-hand twist and the other $b$ a left-hand twist. These elements have their extremities shaped as spurs or lugs $a^1$ $b^1$ which are offset or inclined away from the twisted portion and adapted to be engaged by the bolts or hinge pins $c$ whereby the side flaps or wings $d$ $e$ are pivoted to the tread elements. The side flaps are slotted at $d^1$ $e^1$ as shown in Fig. 1 to allow the lugs $a^1$ $b^1$ to enter into the side flaps. The off-set spurs $a^1$ $b^1$ on the tread elements may be provided with projections or outer faces to act as stops and thereby limit the movement of the side flaps or wings $d$ $e$ relatively to the tread elements in the known manner.

As will be understood from Fig. 2, these twisted elements $a$ $b$ extend across the tread of the pneumatic tire T of the wheel.

The tread elements $a$ $b$ may be made of twisted metal bar which is of square, oblong or triangular shape in cross section, the angular edges of said elements providing an excellent grip between element and tire tread and also between element and ground and, as compared for instance with channel-section elements, the twisted element $a$ or $b$ does not carry clay, snow or the like.

It will be understood that the shoes comprising these twisted elements $a$ $b$ are linked together by suitable chains or link members at the sides of the shoe and looped for instance to the side wings $d$ $e$, as in my specification No. 1,942,337.

Instead of employing side wings, I may as shown in Figs. 5 and 6 form the element $a$ with prolonged end lugs $a^1$ and loose caps $g$ each secured to its lug by a bolt $g^1$; these caps $g$ are adapted to be engaged by the lateral retaining-chains $h$. The end lug is of such a length as to form a seating for the cap $g$ as the latter is clamped against the end lug $a^1$ by the bolt $g^1$.

The one-piece, rigid twisted or coiled element for a shoe and according to the present invention, is inexpensive to make, is of light weight and is easily fitted in position between side flaps or side walls of the shoe or otherwise attached to the side retaining-chains.

What I claim is:—

1. In a non-skid device comprising a plurality of shoes and side chains connecting said shoes around the wheel, a shoe comprising a metal bar of angled section extending transversely over the tread of the wheel, said bar being twisted intermediately of its ends, said ends being continued in a direction towards the axis of the wheel, and caps clamped upon said continued ends, said side chains being engaged between said caps and said continued ends and acting by their tension to maintain said shoe in radial relation to said wheel.

2. In a non-skid device comprising a plurality of shoes and side chains connecting said shoes around the wheel, said shoes including spirally twisted bars extending transversely across the tread of the tire, means for securing said shoes to said side chains, comprising members extending from opposite extremities of said twisted bars in fixed relation to the radial planes thereof, and means for clamping said connecting side chains to said members, said clamping means providing a control to maintain each of said bars and said members extending therefrom in a definite radial position by the pull of said connecting chains.

3. In a non-skid device comprising a plurality of shoes and side chains connecting said shoes around the wheel, said shoes including spirally twisted bars extending transversely across the tread of the tire, means for securing said shoes to said side chains, comprising side wings at opposite extremities of said twisted bars, pivotal connections between said side wings and said twisted bars, said pivotal connections having their pivotal axes substantially tangential to the circumference of said tire and being adapted to maintain said side wings and said twisted bars in the same radial planes of said wheel, and means for connecting said side chains to said side wings at points thereof spaced apart in directions parallel to the respective pivotal axes.

4. In a non-skid device comprising a plurality of shoes and side chains connecting said shoes around the wheel, said shoes including spirally twisted bars extending transversely across the tread of the tire, means for securing said shoes to said side chains, comprising integral projections at opposite extremities of said twisted bars, caps mounted upon said projections and adapted to engage said connecting side chains with said projections, and clamping bolts securing said caps to said projections, each of said twisted bars being maintained in a radial plane of said wheel by the pull of said connecting side chains.

5. In a non-skid device of the character described, a shoe consisting of a metal bar of angled section adapted to extend transversely over the tread of the tire, said bar being twisted intermediately of its ends, said ends being continued in a direction adapted to extend over the sides of said tire, bolts extending through said ends in a common plane adapted to lie radially of said tire, and caps secured upon said bolts, each of said caps being adapted to engage a link of one of said connecting side chains, and the pull of said side chains acting at opposite ends of said engaged links to maintain said shoe in fixed radial position when mounted upon said tire.

DONALD STUART KENNEDY